United States Patent [19]

Jones

[11] Patent Number: 5,205,793
[45] Date of Patent: Apr. 27, 1993

[54] ROPE OR CHAIN HAULING PULLEY

[75] Inventor: Stephen K. Jones, Stratford, Conn.

[73] Assignee: Campbell Hausfeld/Scott Fetzer Company, Harrison, Ohio

[21] Appl. No.: 696,046

[22] Filed: May 6, 1991

[51] Int. Cl.$^5$ .............................................. F16H 55/36
[52] U.S. Cl. .................................... 474/141; 474/160; 474/164; 474/175
[58] Field of Search ........ 474/141, 152, 153, 155–158, 474/160, 164, 175, 179

[56] References Cited

U.S. PATENT DOCUMENTS

| | | | |
|---|---|---|---|
| D. 304,119 | 10/1989 | Lyall et al. | D34/33 |
| 36,087 | 8/1862 | Harfield . | |
| 264,924 | 9/1882 | Baxter . | |
| 272,433 | 2/1883 | Harrison . | |
| 394,335 | 12/1988 | Chase . | |
| 423,132 | 3/1890 | Conyngham | 474/175 |
| 459,588 | 9/1891 | Lewis | 474/175 X |
| 494,131 | 3/1893 | Edmunds | 474/175 X |
| 655,943 | 8/1990 | Williamson | 474/164 X |
| 808,063 | 12/1905 | Alexander . | |
| 1,174,866 | 3/1916 | Jeffreys et al. | 474/175 X |
| 1,231,856 | 7/1917 | Crane . | |
| 1,619,793 | 3/1927 | Kerr | 474/175 |
| 1,993,744 | 3/1935 | Morison . | |
| 2,321,702 | 11/1942 | Renkin . | |
| 2,875,981 | 3/1959 | Hunter . | |
| 2,935,881 | 12/1960 | Cayton . | |
| 3,279,762 | 10/1966 | Bruns | 474/175 X |
| 3,302,932 | 2/1967 | Wallin . | |
| 3,415,135 | 12/1968 | Royer et al. . | |
| 3,709,466 | 1/1973 | Dowrelio | 254/343 |
| 3,744,760 | 7/1973 | Uher | 254/351 |
| 3,766,791 | 10/1973 | Huttinger . | |
| 3,792,622 | 2/1974 | Lyall | 474/164 X |
| 3,797,806 | 3/1974 | Demmert | 474/164 X |
| 3,881,361 | 5/1975 | Newell . | |
| 3,985,340 | 10/1976 | Guangorena . | |
| 4,023,775 | 5/1977 | Beattie . | |
| 4,034,556 | 7/1977 | Riber . | |
| 4,151,980 | 5/1979 | Burton et al. . | |
| 4,274,620 | 6/1981 | Uher | 254/351 |
| 4,399,979 | 8/1983 | Adelman . | |
| 4,413,981 | 11/1983 | White et al. . | |
| 4,473,364 | 9/1984 | Rolling . | |
| 4,497,471 | 2/1985 | Longberg et al. . | |
| 4,501,577 | 2/1985 | Roling et al. . | |
| 4,683,834 | 8/1987 | Fujimoto et al. . | |

FOREIGN PATENT DOCUMENTS

| | | | |
|---|---|---|---|
| 467985 | 6/1914 | France | 474/175 |
| 27210 | 12/1902 | Switzerland . | |
| 911659 | 11/1962 | United Kingdom | 474/164 |
| 1441054 | 6/1976 | United Kingdom | 474/175 |

Primary Examiner—Ramon S. Britts
Assistant Examiner—Roger J. Schoeppel
Attorney, Agent, or Firm—Wood, Herron & Evans

[57] ABSTRACT

A pulley is described for hauling strands of rope or chain and for engaging a splice coupling a strand of rope to a strand of chain. A plurality of pockets are arranged about the periphery of the pulley for positively engaging every other chain link. A plurality of pairs of rope-engaging surfaces are located between adjacent pockets and within the pockets. Rope and chain occupy substantially the same diameter of the pulley resulting in substantially the same speed and torque characteristics whether rope or chain is being hauled.

13 Claims, 6 Drawing Sheets

ROPE OR CHAIN HAULING PULLEY

BACKGROUND OF THE INVENTION

1. Field of the Invention

This invention relates generally to windlasses and, more particularly to windlass pulleys for hauling either rope or chain.

2. Description of the Related Art

Pulleys capable of handling both rope and chain are often used in windlasses for hauling anchors. In one prior art rope/chain pulley disclosed in U.S. Pat. No. 3,792,622, an outer channel of pockets or ribs drives the chain while an inner groove or sheave arrangement drives the rope. When the chain is driven on one diameter of the pulley and the rope is driven on a distinctly different diameter, significant speed and torque variations between the chain and the rope result.

Some prior art pulleys, such as that disclosed in U.S. Pat. No. 4,034,556 have a number of tooth formations which serve to engage both rope and chain. The number of tooth formations is fixed by the pulley diameter and the size of the chain to be hauled. This design is satisfactory for hauling chain, however, slippage may occur when rope is engaged with the pulley. Rope slippage results from limiting the number of rope-driving teeth to the number of chain-driving teeth.

SUMMARY OF THE INVENTION

An object of the present invention is to provide a pulley for uphauling and downhauling both rope and chain with minimal slippage.

Another object of the invention is to provide a pulley for hauling both rope and chain with minimal disparity between chain and rope line speeds.

A further object is to provide a pulley having a number of rope-driving surfaces independent of the number of chain-driving surfaces.

Another object is to provide a pulley with teeth for engaging and driving a length of rope spliced or coupled to a length of chain.

In a preferred embodiment, the pulley for hauling chain and rope includes a hub, and a first set of opposed pairs of radially extending teeth circularly spaced around the hub. Each pair of opposed teeth of the first set have confronting rope-engaging surfaces which slope away from each other in a radially outward direction. The first set of teeth define chain link receiving pockets and have flanks transverse to the confronting surfaces adapted to drivingly engage the links of a chain wrapped around the pulley. The pulley further includes base surface portions in the pockets facing radially outward for engaging the links of a selected size chain received in the pockets. The pulley also includes a second set of opposed pairs of radially extending teeth circularly spaced around the hub. The second set of teeth are radially shorter than the first set of teeth and have confronting rope-engaging surfaces which taper away from each other in a radially outward direction on the same angle as the rope-engaging surface of the first set of teeth.

Other objects and advantages and a fuller understanding of the invention will be had from the following detailed description of a preferred embodiment in the accompanying drawings.

DESCRIPTION OF THE PREFERRED EMBODIMENT

Figure 1:
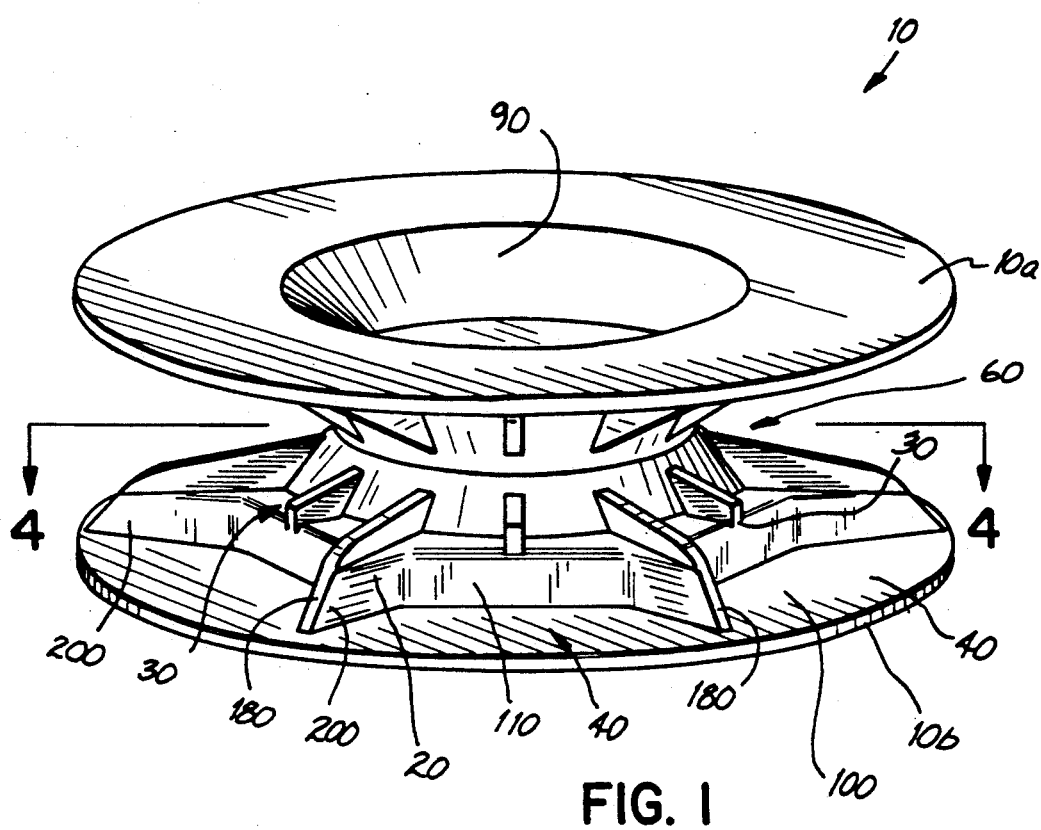
FIG. 1 is a perspective view of a pulley embodying the present invention.
Figure 3:
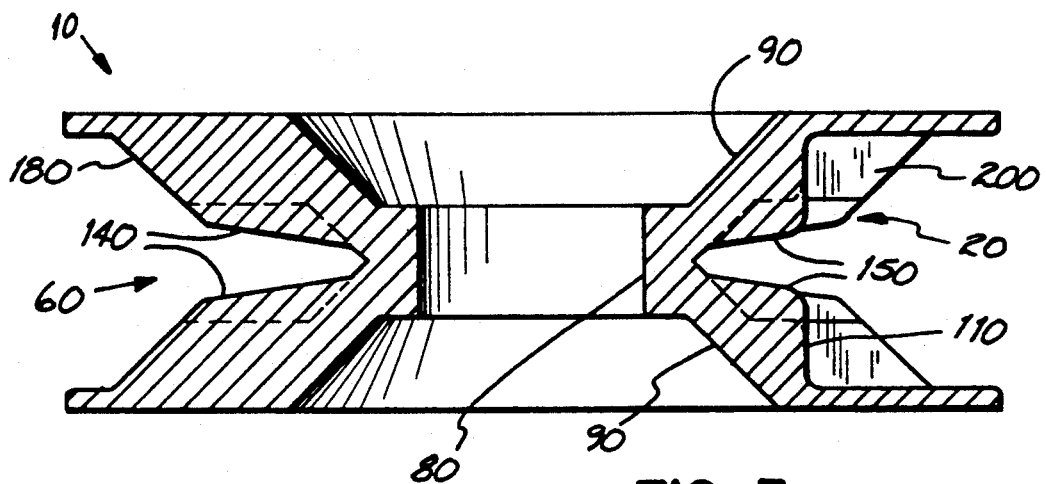
FIG. 3 is a cross-sectional view seen approximately from the plane indicated by the line 3—3 of FIG. 2.
Figure 2:
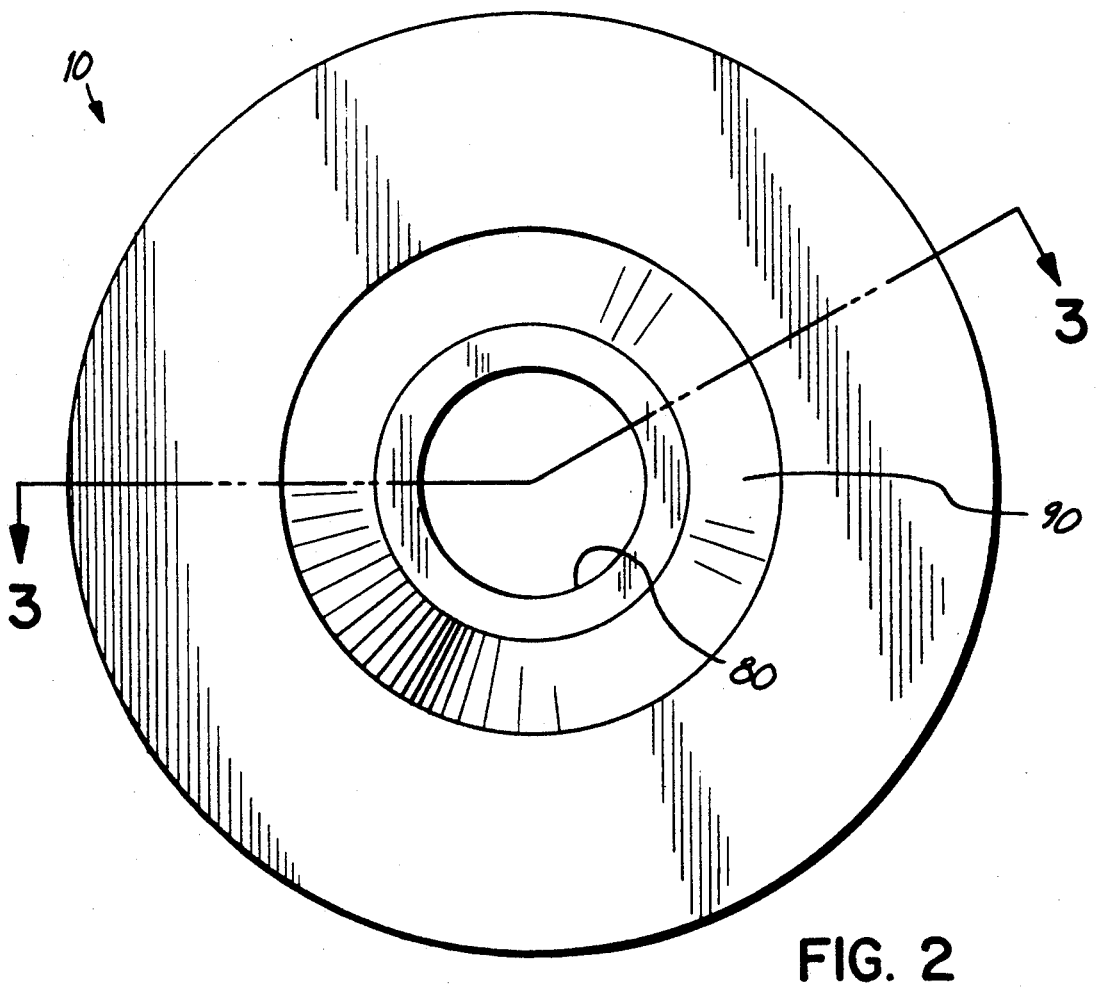
FIG. 2 is a plan view of the pulley of FIG. 1.

Referring now to the drawings, and to FIG. 1 in particular, a pulley embodying the present invention is generally designated by reference numeral 10. The pulley 10 is preferably a one-piece unit having complementary halves 10a, 10b. Each half 10a,b has radially extending, circularly spaced major teeth 20 and minor teeth 30. The major teeth 20 extend radially further from the axis of the pulley than the minor teeth. The major and minor teeth of one half 10a are directly opposed to corresponding major and minor teeth on the other half 10b. Pockets 40 are formed in the pulley 10, each of which accommodates a chain link 50a. A rope channel 60 is formed in the pulley 10 for engaging and driving rope. A length of chain or rope, or a splice 70 coupling chain to rope, may be driven in either direction of rotation of the pulley 10.

In the preferred and illustrated embodiment, the pulley 10 has a hub 52 and a through-bore 80 centrally formed therein. Frustoconical cavities 90 are formed in the pulley's end faces. One or both of the frustoconical cavities 90 may be used as a friction surface of a clutch system. In such an arrangement, a male driven clutch element (not shown) is urged into frictional engagement with one or both of the sides of the frustoconical cavities 90 to drive the pulley 10. The bore 80 accommodates a shaft (not shown) which rotatably supports the pulley 10.

One half of each pocket 40 is defined by two adjacent, angularly spaced major teeth 20, a side wall 100, and a planar base 110. The other half of each pocket 40 is defined by identical, directly opposed parts formed in the other half of the pulley 10. The outer end surfaces 120 of the minor teeth 30 form part of the base. Each of the major teeth 20 has a flank portion 130 for engaging chain links. When the pulley 10 rotates, one pair of flank portions 130 positively engages the link 50a resting within the pocket 40 once any slack has been taken up. If the direction of rotation of the pulley is reversed, the flank portions 130 at the opposite end of the pocket 40 will engage and drive the chain link 50a.

Figure 5:
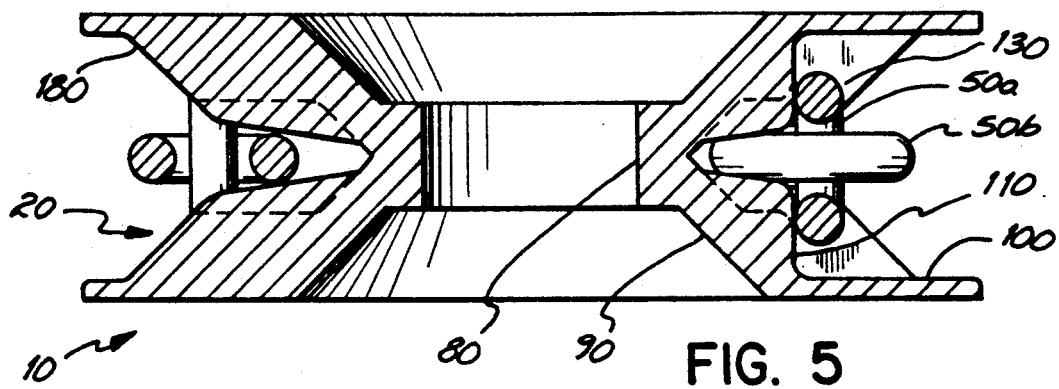
FIG. 5 is a view similar to FIG. 3 and is a cross sectional view seen approximately from the plane indicated by the line 5—5 of FIG. 4.
Figure 4:
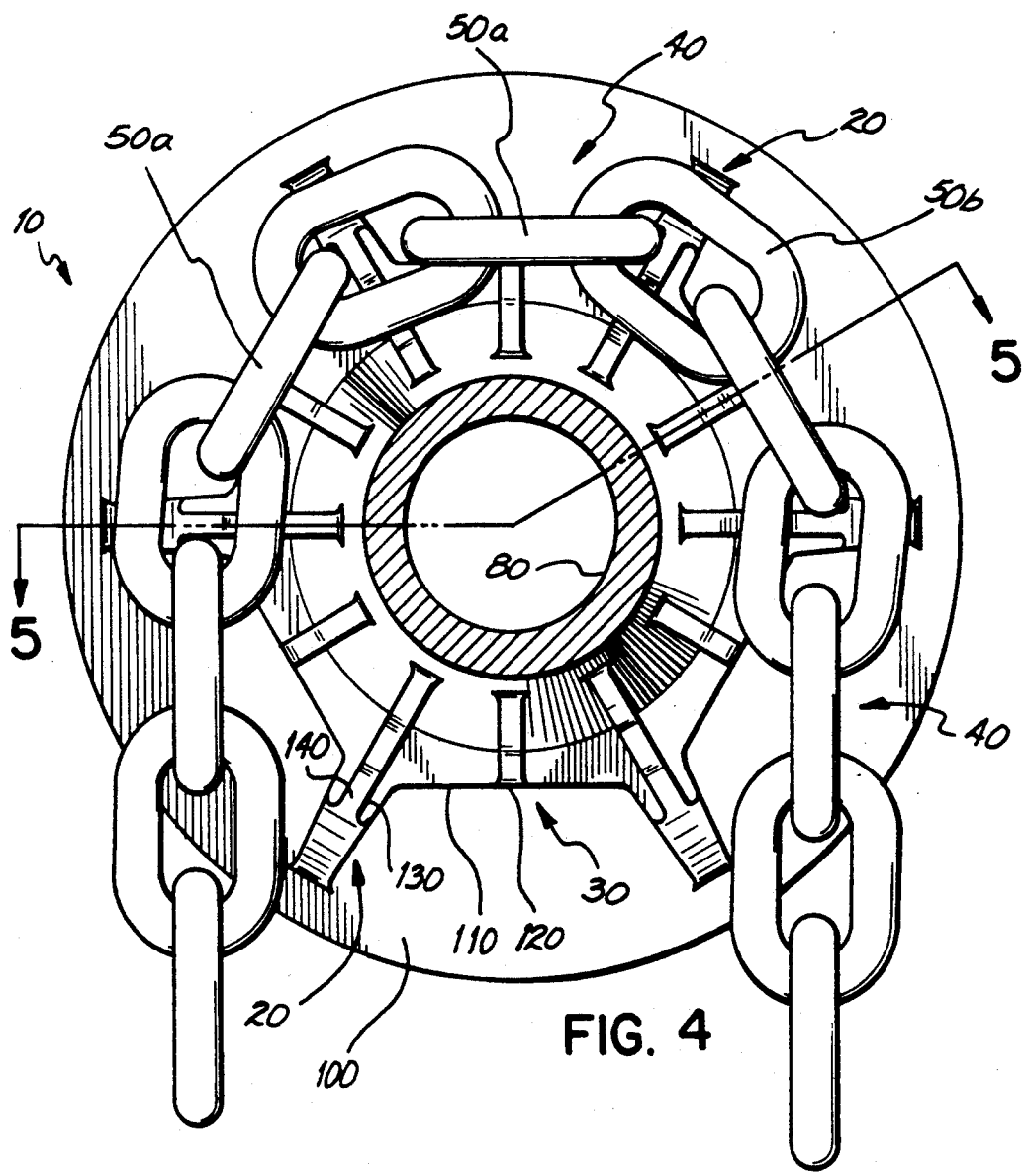
FIG. 4 is a cross-sectional view as seen approximately from the plane indicated by the line 4—4 in FIG. 1 with a chain engaging the pulley.

The pockets 40 are adapted to engage chain links of varying sizes. However, the pulley dimensions and number of major teeth are chosen such that one chain link size will optimally fit the pulley 10. The preferred match of chain size to pulley size is illustrated in FIGS. 4 and 5. The chain links 50a illustrated in FIGS. 4 and 5 rest on the bases 110. It is possible to haul larger sized chain links which do not contact the bases 110 with the pulley 10. However, it is preferred that the chain size be matched to the pulley size such that alternate links 50a engage the bases 110 as illustrated in FIGS. 4 and 5 because the bases 110 exert additional driving force on the links 50a as the pulley 10 is rotated. In addition, the bases 110 act to stabilize the chain links 50a in the pockets 40. A chain fitting the pulley 10 in the manner illustrated in FIG. 4 operates with lower noise than chain of other sizes. The number of major teeth 20 are selected for a given size pulley diameter and a given chain size to permit alternate links 50a to fit each pocket in the manner illustrated in FIGS. 4 and 5.

Alternate chain links 50b oriented in a plane normal to the axis of the pulley join the links 50a which are within the pockets 40. Unlike the driven links 50a, the alternate links 50b which do not rest within a pocket 40 are not positively engaged for driving by the pulley 10.

The major teeth 20 include rope-engaging surfaces 140 which lie in opposed pairs and define the rope channel 60 therebetween. The rope-engaging surfaces 140 are formed transverse to and adjacent to the chain-engaging surfaces 130 (FIG. 4). The minor teeth 30 have opposed rope-engaging surfaces 150 which also define the rope channel 60. The channel 60 between the rope engaging surfaces 140,150 is tapered to converge in the direction of the pulley axis such that the rope tends to be wedged into driving engagement with the pairs of confronting teeth 20,30 when wrapped about a portion of the pulley 10 under tension. All of the opposed pairs of rope-engaging surfaces 140,150, whether on major or minor teeth, have the same degree of taper therebetween. The point of engagement between the rope and the minor teeth 30 is approximately the same distance from the axis of the pulley 10 as it is for the major teeth 20. The preferred angle of taper as measured between any of the opposed rope-engaging surfaces 140, 150 is approximately 17 degrees.

Figure 7:
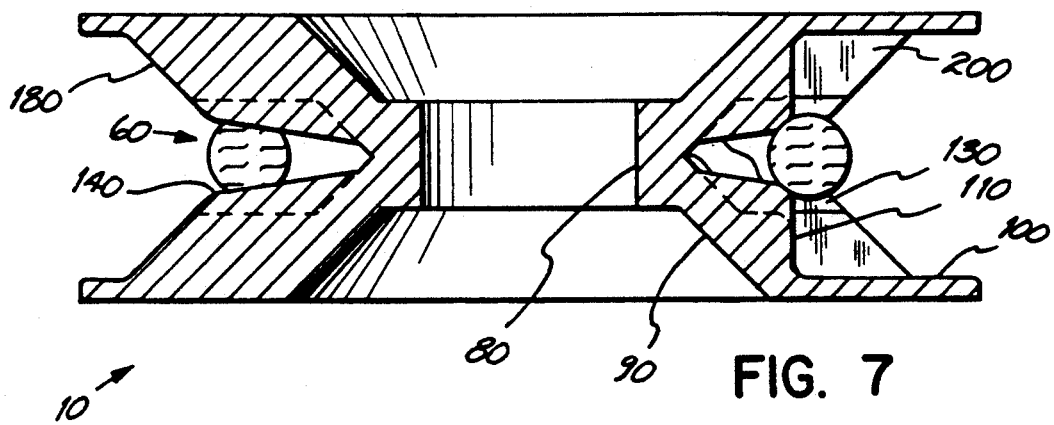
FIG. 7 is a cross sectional view taken on the line 7—7 of FIG. 6 showing a rope engaging the pulley.
Figure 6:
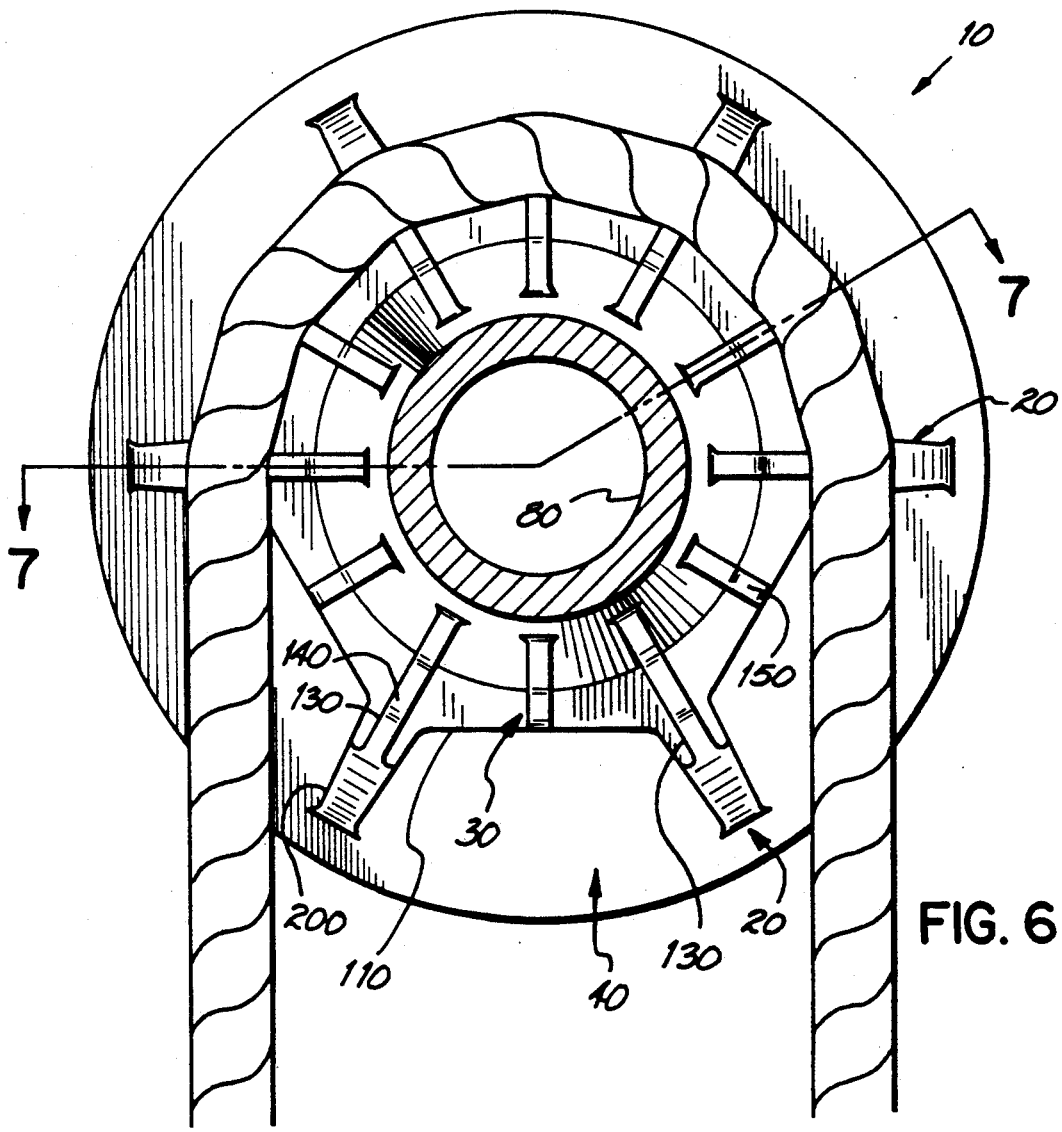
FIG. 6 is the same view as FIG. 5, but with a rope engaging the pulley.

The pulley 10 is configured to haul rope and chain at approximately the same radial position on the pulley. Thus, when a line being hauled by the pulley switches from rope to chain, or vice versa, the torque load on the motor does not change, nor does the speed at which the line moves. While different rope diameters will engage the pulley at different radial positions due to the taper of the rope channel 60, a selected rope size as illustrated in FIGS. 6 and 7 will ride on the pulley 10 at approximately the same radial position as a chain resting on the bases 110 of each pocket. Thus, by matching the appropriate rope and chain sizes to the pulley 10, the line speed and torque characteristics between rope and chain do not change.

Figure 9:
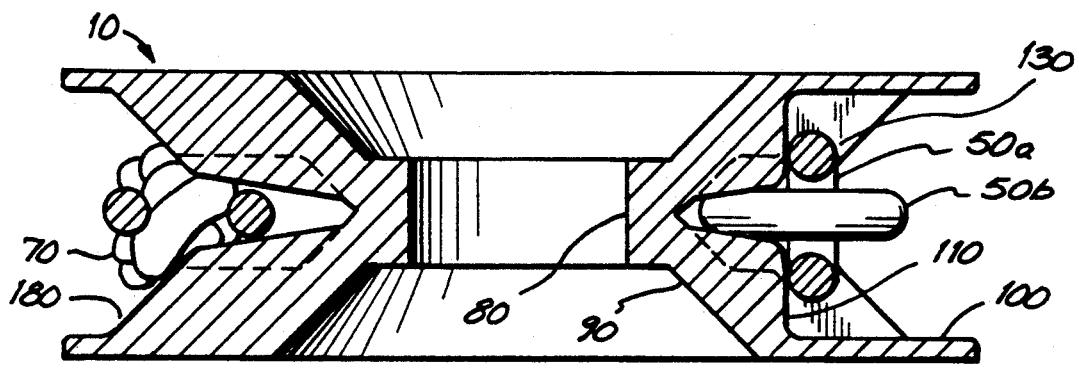
FIG. 9 is a cross sectional view seen approximately from the plane indicated by line 9—9 of FIG. 8.
Figure 8:
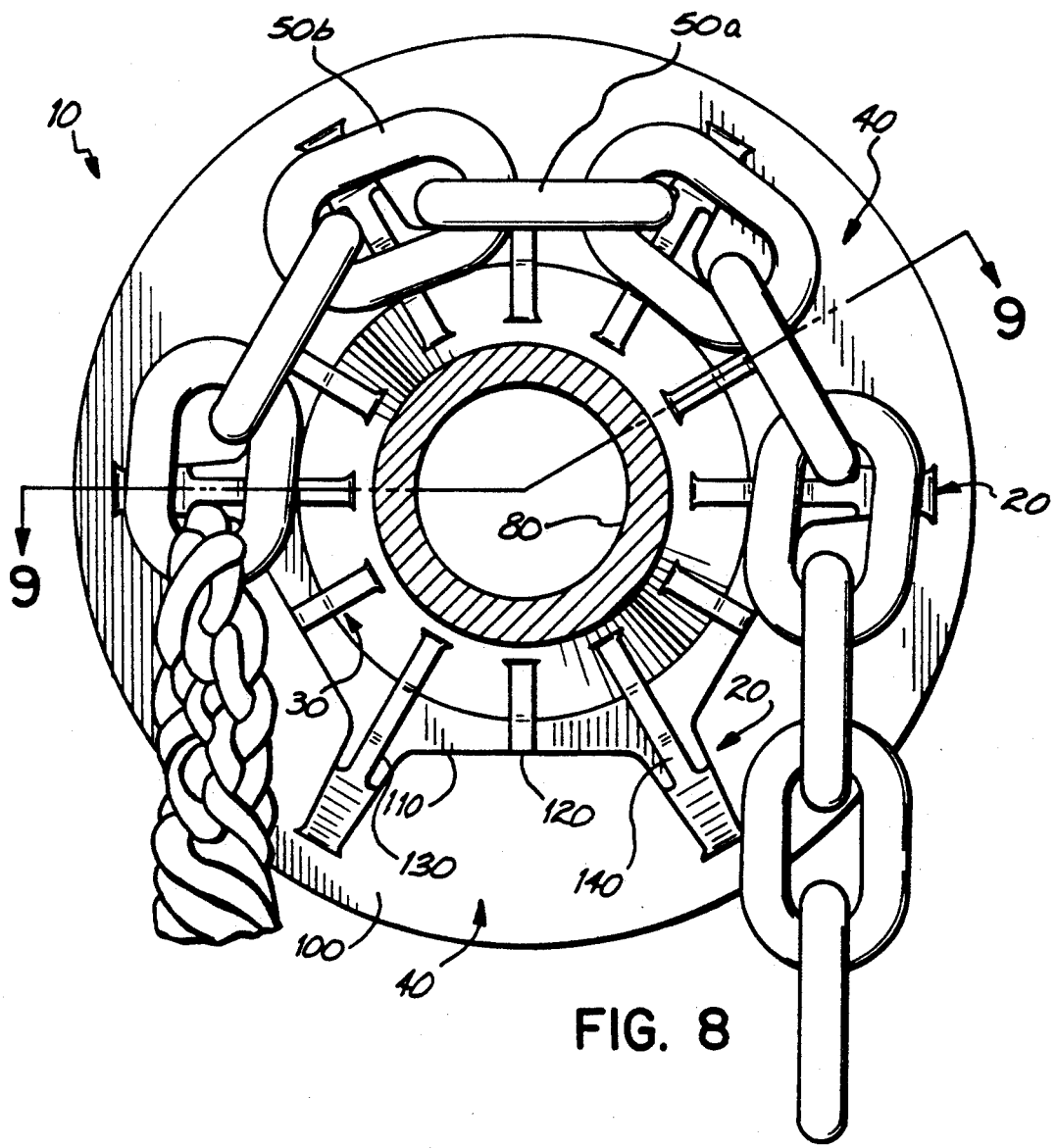
FIG. 8 is a view similar to the views of FIGS. 4 and 6 showing a spliced rope and chain engaging the pulley.
Figure 10:
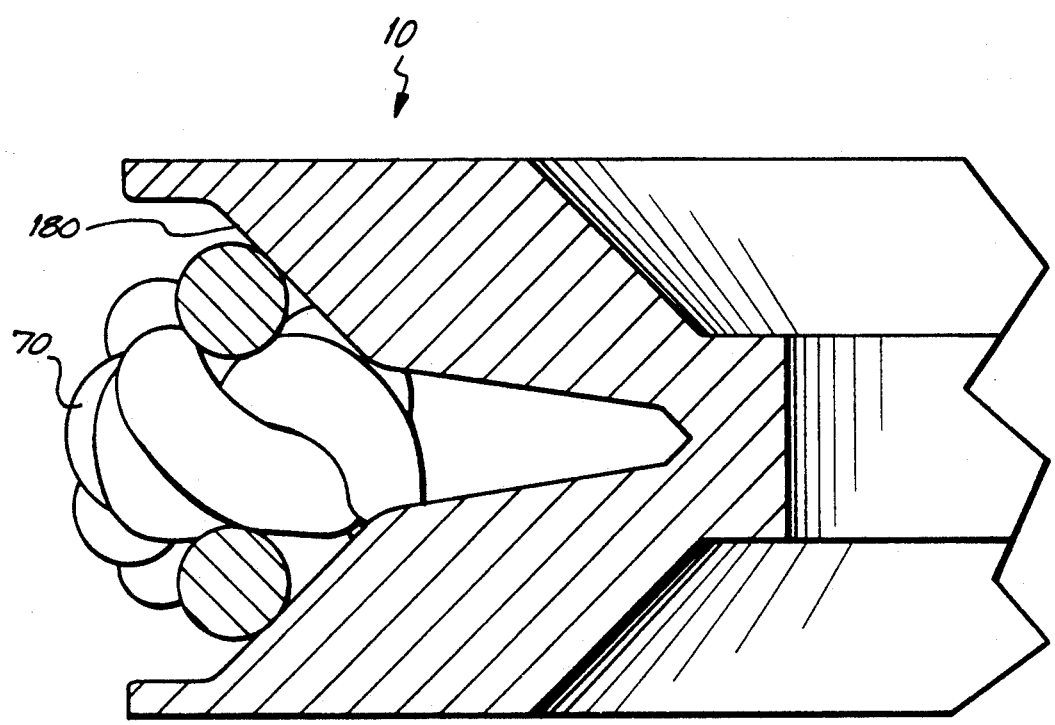
FIG. 10 is an enlarged fragmentary cross sectional view of the pulley with a rope-chain splice engaging the pulley.

Splice-engaging teeth 180 are formed at the radially outermost portions of the major teeth 20. A splice 70 coupling a length of rope to a length of chain is irregular in width and its position on the pulley 10 depends on its orientation (FIGS. 8-10). Generally, the splice 70 is wider than the rope or chain alone and is too wide to engage either the flank portions 130 or the minor teeth 30. The splice-engaging teeth 180 are constructed and arranged to engage and drive the splice 70 regardless of how it is oriented when it enters the pulley 10.

The size of the splice 70 and its orientation determine where it will be engaged by the pulley 10. The splice-engaging teeth of the pulley 10 permit the splice 70 to be driven either in the manner rope is driven by the major and minor teeth 20,30, or in the manner chain is driven by the flank portions 130. Stated another way, the splice 70 may be wedged between the opposed splice-engaging teeth or positively engaged by flanks 200 of the splice-engaging teeth. Smaller splices would engage the pulley closer to the pulley axis. The tapered space formed between the opposed splice-engaging teeth 180 converges towards the pulley axis at a relatively wide angle permitting relatively wide splices to be wedged between the splice teeth 180 and driven. The preferred angle of taper as measured between the splice-engaging teeth 180 is approximately ninety degrees. FIGS. 8 and 9 illustrate the splice oriented in one direction (with the plane of the chain link forming the splice 70 lying normal to the pulley axis) and FIG. 10 shows the splice 70 oriented in a position rotated ninety degrees from that of FIGS. 8 and 9. Regardless of the position or orientation of the splice 70, the splice-engaging teeth 180 engage and drive the splice with minimal slippage.

While a single preferred embodiment of the invention has been illustrated and described in detail, the present invention is not to be considered limited to the precise construction disclosed. Various adaptations, modifications and uses of the invention may occur to those skilled in the art to which the invention relates and the intention is to cover hereby all such adaptations, modifications and uses which fall within the spirit or scope of the appended claims.

Having described my invention I claim:

1. A rope-chain pulley comprising:
   a hub;
   a first set of opposed pairs of radially extending teeth circularly spaced around said hub, each pair of opposed teeth of said first set having confronting rope-engaging surfaces which slope away from each other in a radially outward direction, said first set of teeth defining chain link receiving pockets and having flanks transverse to said confronting surfaces adapted to drivingly engage the links of a chain wrapped around said pulley;
   base surface portions in said pockets facing radially outward for engaging the links of a selected size chain received in said pockets; and,
   a second set of opposed pairs of radially extending teeth circularly spaced around said hub, said second set of teeth being radially shorter than said first set of teeth and having confronting rope-engaging surfaces which taper away from each other in a radially outward direction on the same angle as the rope-engaging surface of said first set of teeth.

2. The pulley as claimed in claim 1 wherein said first and second sets of teeth alternate around said hub.

3. The pulley as claimed in claim 1 wherein said second set of teeth terminate at said base surface portions.

4. The pulley as claimed in claim 1 wherein said rope-engaging surfaces taper on an angle of about 17 degrees from one another.

5. A pulley for hauling lengths of rope or chain comprising:
   a plurality of pockets arranged about the periphery of said pulley for engaging and driving said chain, each of said pockets having ends defined by angularly spaced chain-driving surfaces extending generally radially from said pulley and each chain driving surface being contained in a plane generally parallel to the axis of rotation of said pulley, such that every other link of said chain fits within one of said pockets; and, a plurality of rope-driving surfaces for engaging and driving rope wherein at least one pair of oppositely facing rope-driving surfaces lies within each pocket, and wherein another pair of oppositely facing rope-driving surfaces lies between adjacent pockets, said pockets and said oppositely facing rope-driving surfaces being configured to haul selected sizes of rope and chain on substantially the same radial position of said pulley.

6. A pulley according to claim 5 wherein said pair of rope-engaging surfaces are directly opposed.

7. A pulley according to claim 5 wherein said rope-driving surfaces lying between adjacent pockets are adjacent to and formed integrally with said chain-driving surfaces.

8. A pulley according to claim 5, wherein the surfaces forming each said pair of rope-driving surfaces are opposed and a tapered space is formed between said opposed rope-driving surfaces for receiving said rope, said space converging in the direction of the axis of said pulley such that a rope tends to be wedged into driving engagement with said rope-engaging surfaces when wrapped about a portion of said pulley under tension.

9. A pulley for hauling length of rope or chain according to claim 5 wherein said pulley further comprises splice-engaging teeth for engaging a splice joining a length of rope to a length of chain.

10. A pulley for hauling lengths of rope or chain comprising:

a first set of angularly spaced radially extending teeth having first opposed rope-engaging surfaces for driving said rope and second adjacent chain-engaging surfaces for driving said chain, each chain-engaging surface being formed integrally with and substantially perpendicular to said rope-engaging surface; and, a second set of angularly spaced radially extending teeth having opposed rope-engaging surfaces for driving said rope.

11. A pulley according to claim 10 wherein said first set of teeth extend radially farther away from the axis of said pulley than said second set of teeth.

12. A pulley according to claim 10 wherein said pulley includes a plurality of splice-engaging teeth formed by radially outward portions of said first set of teeth.

13. A pulley according to claim 10 wherein said pulley includes a planar surface located between every two adjacent teeth of the first set, the plane of each of said surfaces being parallel to the axis of said pulley, wherein said planar surfaces are adapted to engage alternate links of said chain.

* * * * *